No. 762,146. PATENTED JUNE 7, 1904.
W. COSBIE.
ADJUSTABLE HORSE COLLAR MEASURE.
APPLICATION FILED DEC. 1, 1903.
NO MODEL.
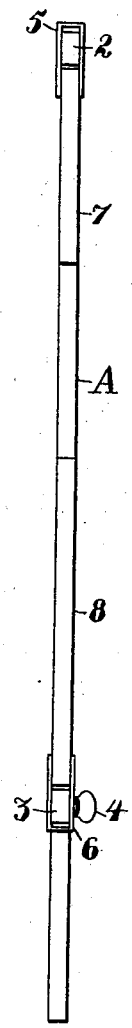
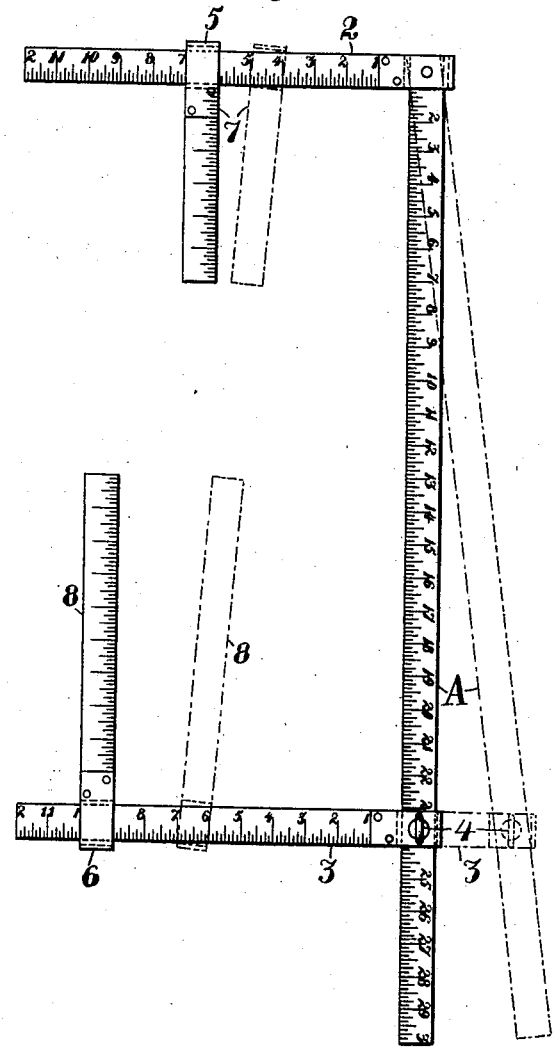

No. 762,146.

Patented June 7, 1904.

UNITED STATES PATENT OFFICE.

WILLIAM COSBIE, OF SAN FRANCISCO, CALIFORNIA.

ADJUSTABLE HORSE-COLLAR MEASURE.

SPECIFICATION forming part of Letters Patent No. 762,146, dated June 7, 1904.

Application filed December 1, 1903. Serial No. 183,338. (No model.)

*To all whom it may concern:*

Be it known that I, WILLIAM COSBIE, a citizen of the United States, residing in the city and county of San Francisco and State of California, have invented new and useful Improvements in Adjustable Horse-Collar Measures, of which the following is a specification.

My invention relates to a device for accurately measuring a horse's neck for a collar. It consists of a ruler having one continuous side sufficiently long to measure the depth of the animal's neck, two transverse sides, one of which is slidable with relation to the longer side, and two other independent sliding measures movable upon the transverse sides and adapted to fit the top and bottom of the animal's neck, so as to give all the necessary measurements.

Referring to the accompanying drawings, Figure 1 is a front view of my device. Fig. 2 is an edge view of same.

A is one of the sides of my measure subdivided into inches or other units and parts thereof, as required. To the upper end of this portion of the measure is fixed a second measure 2, extending transversely from the part A. 3 is a similarly-subdivided measure having a clamp 4, which is slidable upon the vertical portion A, so that this part 3 may be moved nearer to or farther from the upper stationary measure 2. Upon the parts 2 and 3 are fitted slides 5 and 6, and each of them has a section of subdivided ruler, as at 7 and 8, affixed to it and projecting toward each other. These parts 7 and 8 have their ends sufficiently separated so that the device may be placed over a horse's neck, and after being thus placed it may be turned so that the sides A and 7 and 8 are approximately vertical upon each side of the horse's neck. The part 3 can now be moved along the part A until it gives the necessary depth to the collar measured upon the part A. The part 7 is then slidable upon the part 2 until it shows the width of the collar at the top of the neck, and the part 8 is similarly slidable upon the part 3 to show upon said part the necessary width for the bottom of the collar. In this manner I am enabled to exactly measure all the dimensions necessary for perfectly fitting the collar.

I prefer to pivot the clamp by which the part 2 is attached to the part A, so that the part 2 may be tilted more or less about its pivot-pin. This allows the part 2 to extend approximately straight across the top of the horse's neck, while the part A may diverge to follow the thickening of the horse's neck from the top downward. In the same manner the slides 5 and 6, by which the parts 7 and 8 are carried, are sufficiently loose to allow these parts to be tilted, and thus diverge from the top toward the bottom for the same purpose that the part A is diverged.

I am aware that rulers having transverse projections have been made so as to take the depth of the horse's neck for the purpose of making collars; but I do not claim, broadly, such a device; but What I do claim, and desire to secure by Letters Patent, is—

1. A device for measuring a horse's neck for the manufacture of a collar therefor, consisting of a vertical subdivided arm having a transverse subdivided arm fixed to one end, a second transverse subdivided arm slidable upon the vertical arm and projecting in the same direction as the said fixed arm, and short vertical sections slidable upon the transverse sections whereby the width of the upper and lower parts of the horse's neck may be indicated.

2. The combination in a device for measuring a horse's neck for collars of a vertical arm adapted to fit one side of the neck, subdivided transverse arms both projecting in the same direction from the vertical arm and one of which is pivoted to one end of the vertical arm, and a second is slidable upon the opposite end of said arm, short independent arms slidable upon the transverse arms and adapted to measure the width of the top and bottom of the animal's neck.

In testimony whereof I have hereunto set my hand in presence of two subscribing witnesses.

WILLIAM COSBIE.

Witnesses:
 HENRY P. TRICOU,
 S. H. NOURSE.